United States Patent
Kim et al.

(10) Patent No.: US 12,126,047 B2
(45) Date of Patent: Oct. 22, 2024

(54) SEPARATOR FOR SECONDARY BATTERY COMPRISING DISPERSANT AND METHOD OF MANUFACTURING THE SAME

(71) Applicant: LG CHEM, LTD., Seoul (KR)

(72) Inventors: Myeong Soo Kim, Daejeon (KR); Su Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 851 days.

(21) Appl. No.: 17/257,682

(22) PCT Filed: Apr. 17, 2020

(86) PCT No.: PCT/KR2020/005173
§ 371 (c)(1),
(2) Date: Jan. 4, 2021

(87) PCT Pub. No.: WO2020/226296
PCT Pub. Date: Nov. 12, 2020

(65) Prior Publication Data
US 2021/0119302 A1    Apr. 22, 2021

(30) Foreign Application Priority Data
May 9, 2019   (KR) .................. 10-2019-0054480

(51) Int. Cl.
*H01M 50/451*   (2021.01)
*C08J 9/36*   (2006.01)
(Continued)

(52) U.S. Cl.
CPC .......... *H01M 50/451* (2021.01); *C08J 9/365* (2013.01); *C09D 7/20* (2018.01); *C09D 7/45* (2018.01);
(Continued)

(58) Field of Classification Search
CPC ............ H01M 50/451; H01M 50/489; H01M 50/403; H01M 50/417; H01M 50/443;
(Continued)

(56) References Cited

U.S. PATENT DOCUMENTS 5,263,797 A    11/1993   Lindstrom et al.
2008/0292968 A1*   11/2008   Lee ..................... H01M 10/052
                                                              429/247
(Continued)

FOREIGN PATENT DOCUMENTS

AU    2015375555 B2   2/2018
CN    103339757 A    10/2013
(Continued)

OTHER PUBLICATIONS

International Search Report (PCT/ISA/210) issued in PCT/KR2020/005173 mailed on Jul. 23, 2020.
(Continued)

*Primary Examiner* — Christopher P Domone
*Assistant Examiner* — Jonathan William Estes
(74) *Attorney, Agent, or Firm* — Birch, Stewart, Kolasch & Birch, LLP (57) ABSTRACT

A separator for a secondary battery including a porous separator substrate including a polyolefin-based material and a coating layer on at least one surface of the porous separator substrate. The separator for a secondary battery has a uniform coating layer and improved adhesion force. The coating layer is a dry form of a slurry comprising a binder, an inorganic material, a mixed solvent including at least two solvents, and a dispersant, the inorganic material being a metal hydroxide and the dispersant being a compound including 10 to 30 hydroxy groups in one molecule.

12 Claims, 3 Drawing Sheets

(51) Int. Cl.
  *C09D 7/20* (2018.01)
  *C09D 7/45* (2018.01)
  *C09D 7/61* (2018.01)
  *C09D 127/16* (2006.01)
  *H01M 10/052* (2010.01)
  *H01M 50/403* (2021.01)
  *H01M 50/417* (2021.01)
  *H01M 50/434* (2021.01)
  *H01M 50/443* (2021.01)
  *H01M 50/489* (2021.01)

(52) U.S. Cl.
  CPC ............. *C09D 7/61* (2018.01); *C09D 127/16* (2013.01); *H01M 10/052* (2013.01); *H01M 50/403* (2021.01); *H01M 50/417* (2021.01); *H01M 50/434* (2021.01); *H01M 50/443* (2021.01); *H01M 50/489* (2021.01); *C08J 2323/02* (2013.01)

(58) Field of Classification Search
  CPC .... H01M 50/434; H01M 10/052; C09D 7/61; C09D 7/20; C09D 7/45; C08J 9/365; C08J 2323/02
  See application file for complete search history.

(56) References Cited

U.S. PATENT DOCUMENTS

| | | |
|---|---|---|
| 2013/0280584 A1 | 10/2013 | Matsumura |
| 2013/0302661 A1 | 11/2013 | Kim et al. |
| 2015/0252174 A1 | 9/2015 | Ahrens |
| 2015/0372277 A1 | 12/2015 | Honda |
| 2016/0308185 A1 | 10/2016 | Kondo et al. |
| 2016/0355721 A1 | 12/2016 | Cortner et al. |
| 2017/0338460 A1 | 11/2017 | Kim et al. |
| 2018/0277815 A1 | 9/2018 | Sung et al. |
| 2019/0131604 A1 | 5/2019 | Yoon et al. |
| 2019/0355953 A1* | 11/2019 | Nam .................. H01M 50/491 |

FOREIGN PATENT DOCUMENTS

| | | | | |
|---|---|---|---|---|
| CN | 105051940 A | | 11/2015 | |
| CN | 105754489 A | | 7/2016 | |
| CN | 105951078 A | | 9/2016 | |
| CN | 106025149 A | | 10/2016 | |
| CN | 106431414 A | | 2/2017 | |
| CN | 106505172 A | | 3/2017 | |
| CN | 107805320 A | | 3/2018 | |
| CN | 109037551 | * | 12/2018 | ........ H01M 10/0525 |
| CN | 109037551 A | * | 12/2018 | |
| CN | 109052372 A | | 12/2018 | |
| CN | 109314207 A | | 2/2019 | |
| CN | 109428035 A | | 3/2019 | |
| GB | 286948 A | | 3/1928 | |
| JP | 2013-16848 A | | 1/2013 | |
| JP | 2018-63924 A | | 4/2018 | |
| KR | 10-0727247 B1 | | 8/2007 | |
| KR | 10-2013-0059783 A | | 6/2013 | |
| KR | 10-1310577 B1 | | 9/2013 | |
| KR | 10-2014-0021981 A | | 2/2014 | |
| KR | 10-2014-0136807 A | | 12/2014 | |
| KR | 20160108116 A | * | 1/2016 | |
| KR | 10-2016-0092862 A | | 8/2016 | |
| KR | 10-2016-0108116 A | | 9/2016 | |
| KR | 2016108116 A | * | 9/2016 | .......... H01M 10/052 |
| KR | 10-2017-0125615 A | | 11/2017 | |
| KR | 10-2018-0081472 A | | 7/2018 | |
| KR | 20180081472 A | * | 7/2018 | ........ H01M 10/0525 |
| KR | 10-1915345 B1 | | 11/2018 | |
| WO | WO 2017/010780 A1 | | 1/2017 | |
| WO | WO 2018/128484 A1 | | 7/2018 | |

OTHER PUBLICATIONS

Extended European Search Report for European Application No. 20802562.7, dated Jul. 27, 2021.

* cited by examiner

SEPARATOR FOR SECONDARY BATTERY COMPRISING DISPERSANT AND METHOD OF MANUFACTURING THE SAME

TECHNICAL FIELD

This application claims the benefit of priority to Korean Patent Application No. 2019-0054480 filed on May 9, 2019, the disclosure of which is hereby incorporated by reference herein its entirety.

The present invention relates to a separator for a secondary battery comprising a dispersant and a method of manufacturing the same, and particularly, a separator for a secondary battery comprising a dispersant having improved adhesion force due to a binder concentrated on a surface of a separator coating layer and a method of manufacturing the same.

BACKGROUND ART

Since lithium secondary batteries have high output compared to conventional secondary batteries, there is a high interest in securing stability of lithium secondary batteries. In order to increase the safety of a separator, a safety-reinforced separator (hereinafter referred to as 'SRS separator') has been developed and used. The SRS separator is configured to have a structure in which a coating layer including inorganic particles and a binder is formed on a polyolefin-based substrate, thereby providing high safety against high temperatures.

The coating layer of the SRS separator forms a porous structure by the inorganic particles and a volume in which a liquid electrolyte solution is placed is increased by virtue of the porous structure. Therefore, lithium ion conductivity and an electrolyte impregnation rate of the SRS separator are increased, whereby both the performance and the stability of an electrochemical device using the SRS separator may be improved.

In the past, alumina ($Al_2O_3$) was used as the inorganic particles constituting the coating layer of the SRS separator, but aluminum hydroxide has been proposed as an alternative inorganic material for solving the flame retardancy problem.

When preparing a slurry for forming the coating layer of the SRS separator, a cyano-based resin or the like is used to secure a dispersion force of the inorganic particles. However, the aluminum hydroxide is not well dispersed in cyano-based resins.

Therefore, various attempts have been made to develop an inorganic material with improved dispersibility while solving the flame retardancy problem.

Patent Document 1 relates to a coating separator for a secondary battery comprising that an organic-inorganic composite coating layer is applied on one or both surfaces of a polyolefin-based porous base film, the organic-inorganic composite coating layer comprising 1 to 20 parts by weight of polyvinylidene-fluoridene-based resin based on 100 parts by weight of cellulose-based resin, 1,000 to 6,000 parts by weight of an inorganic filler, and 1 to 10 parts by weight of a dispersant.

Patent Document 1 discloses the separator coated with the organic-inorganic composite coating layer on the base film, but fails to disclose a technology for improving the dispersion force depending on the type of inorganic particles.

Patent document 2 relates to a battery cell including a porous polymer substrate and an organic-inorganic porous coating layer formed on at least one surface of the porous polymer substrate, the porous polymer substrate including a PVdF-HFP polymer binder in which an amount of hexafluoropropylene (HFP) is high, and a PVdF-HFP in which an amount of HFP is low.

Patent Document 2 improved adhesion force to an electrode by forming the organic-inorganic porous coating layer including two kinds of binders. However, Patent Document 2 fails to disclose a technology capable of improving the dispersion force of inorganic particles in the organic-inorganic porous coating layer.

Patent Document 3 relates to a method of manufacturing a separator for an electrochemical device comprising the steps of obtaining a porous polyolefin film by extracting a plasticizer from a polyolefin film, coating a slurry for forming a porous flame-retardant coating layer on at least one surface of the porous polyolefin film, and heat-setting the porous polyolefin film coated with the slurry to obtain a composite separator having a porous flame-retardant coating layer.

Patent Document 3 has a feature of having a self-extinguishing function by forming the flame-retardant coating layer including flame-retardant particles, but fails to disclose a technology for improving adhesion force.

There is a need to improve the technology capable of securing adhesion force to an electrode while exhibiting uniform physical properties by improving dispersion force of inorganic materials used to form a coating layer of a separator with improved safety, but a clear solution has not yet been proposed.

PRIOR ART DOCUMENT (Patent Document 1) Korean Patent Application Publication No. 2013-0059783 (2013.06.07)

(Patent Document 2) Korean Patent Application Publication No. 2016-0108116 (2016.09.19)

(Patent Document 3) Korean Registered Patent Publication No. 1915345 (2018.10.30)

DISCLOSURE

Technical Problem

The present invention has been made in view of the above problems, and in particular, it is an object of the present invention to provide a separator for a secondary battery in which adhesion force to an electrode can be prevented from being lowered while a uniform coating layer is formed by improving the dispersibility of a separator coating layer including a metal hydroxide inorganic material with improved safety, and a method of manufacturing the same.

Technical Solution

In accordance with the present invention, the above and other objects can be accomplished by the provision of a separator for a secondary battery comprising a porous separator substrate of a polyolefin-based material; and a coating layer coated on at least one surface of the porous separator substrate, wherein the coating layer is a dry form of a slurry comprising a binder, an inorganic material, a mixed solvent comprising at least two solvents, and a dispersant; the inorganic material is a metal hydroxide, and the dispersant is a compound including 10 to 30 hydroxy groups in one molecule.

The metal hydroxide may be represented by the following formula (1), $$M(OH)_x \quad (1)$$

wherein in the formula (1), M is B, Al, Mg, Co, Cu, Fe, Ni, Ti, Au, Hg, Zn, Sn or Zr, and x is an integer of 1 to 4.

The dispersant may be at least one selected from the group consisting of tannic acid, pyrogallic acid, ellagic acid, amylose, amylopectin, and xanthan gum.

An amount of the dispersant present in the coating layer may be 0.1 wt % to 0.3 wt %.

The mixed solvent may include an alcohol.

The alcohol may be an alcohol having 1 to 5 carbon atoms.

An amount of the alcohol present may be 5 wt % to 20 wt % based on a total amount of the mixed solvent.

In the coating layer a higher concentration of the binder is present at an outermost surface of the separator.

In addition, the present invention provides a method of manufacturing the separator for a secondary battery, the method comprising the steps of:

(a) preparing a primary slurry by adding and mixing the inorganic material and the dispersant in the mixed solvent comprising at least two solvents;

(b) preparing a secondary slurry by adding and mixing the binder to the primary slurry; and (c) coating and drying the secondary slurry on the at least one surface of the porous separator substrate comprising the polyolefin-based material, wherein the inorganic material is a metal hydroxide, and the dispersant is a compound including 10 to 30 hydroxy groups in one molecule.

The mixed solvent may include an alcohol.

Step (c) may comprise a vapor-induced phase separation (VIPS) process.

During the vapor-induced phase separation process, liquid-induced phase separation (LIPS) may occur simultaneously.

In addition, the present invention provides an electrochemical device comprising the separator for a secondary battery.

BEST MODE

The present invention provides a separator for a secondary battery having improved coatability so as to form a uniform coating layer on a separator substrate by improving dispersion force of a metal hydroxide inorganic material constituting a separator coating layer for a secondary battery and having excellent adhesion force to an electrode; a method of manufacturing the same; and an electrochemical device comprising the separator for a secondary battery.

In a concrete example according to the present invention, a coating layer is formed on at least one surface of a porous separator substrate of a polyolefin-based material; the coating layer is a dry form of a slurry comprising a binder, an inorganic material, a mixed solvent including two or more solvents, and a dispersant; the inorganic material is a metal hydroxide; and the dispersant is a compound including 10 to 30 hydroxy groups in one molecule.

The inorganic material used in the coating layer serves to improve the mechanical strength of the separator, and alumina ($Al_2O_3$) has often been used in the past. However, the use of metal hydroxide has recently been increasing for the purpose of improving flame retardancy.

The metal hydroxide may be represented by the following formula (1), and preferably, aluminum hydroxide (Aluminum trihydroxide, $Al(OH)_3$) may be used.

$$M(OH)_x \quad (1)$$

(In the formula (1), M is B, Al, Mg, Co, Cu, Fe, Ni, Ti, Au, Hg, Zn, Sn or Zr, and x is an integer of 1 to 4.)

In order to disperse the inorganic material in the slurry for the coating layer, a metal oxide has been dispersed in a cyano-based resin in the past. However, when the metal hydroxide is used as the inorganic material as in the present invention, the dispersion force of metal hydroxide in the cyano-based resin is poor. Thus, as the dispersant for the metal hydroxide, the present invention may use at least one selected from the group consisting of tannic acid, pyrogallic acid, ellagic acid, amylose, amylopectin, and xanthan gum, and specifically, tannic acid may be used.

The amount of the dispersant may be 0.1 wt % to 0.3 wt %. When the amount of the dispersant is less than 0.1 wt %, a phenomenon in which the phase of the slurry is unstable and precipitates occurs, and thus, there is a problem in that it is difficult to control the thickness during coating, which is not preferable. When the amount of the dispersant is more than 0.3 wt %, there is a problem in that the adhesion force to the electrode is significantly reduced, which is not preferable.

The mixed solvent is one in which the binder and the inorganic material may be uniformly mixed and dispersed, and may be the mixed solvent containing two or more solvents. For example, the mixed solvent may be alcohols, acetone, tetrahydrofuran, methylenechloride, chloroform, dimethylformamide, N-methyl-2-pyrrolidone (NMP), cyclohexane, water or a mixture thereof.

The mixed solvent is all removed in a drying process after coating the coating slurry on the separator substrate. Therefore, the mixed solvent does not remain in the separator coating layer of the finished product.

The higher the solvent power for the binder resin in the mixed solvent, the more the amount of the binder resin may be increased, and the coating slurry may maintain a stable dispersion state. In addition, the lower the boiling point, the easier it is to remove the mixed solvent in the drying process of the coating film. That is, it is suitable that the boiling point of the mixed solvent is 40° C. to 150° C.

Since the dispersant includes many hydroxy groups, aluminum hydroxide is well dispersed. However, this causes that the binder in the coating layer is prevented from moving to a surface of the coating layer in a vapor-induced phase separation process after coating the slurry for the coating layer on the separator substrate. This causes a problem of lowering the adhesion force between the separator and the electrode.

Thus, the present invention solved the above problems by using a mixed solvent containing alcohol. That is, when using an alcohol solvent, since the mixed solvent includes a solvent containing a hydroxy group, dispersibility of the metal hydroxide may be secured, and at the same time, phase separation occurs not only on the surface of the separator but also within the coating layer due to the alcohol solvent acting as a non-solvent during the formation of the coating layer. Therefore, the binder may be distributed more on the surface of the coating layer, thereby further securing the adhesion force between the separator and the electrode. In addition, since the mixed solvent is completely dried in the drying process after the coating layer is formed, it is possible to eliminate the possibility of side effects that may occur in the battery.

The alcohol may be an alcohol having 1 to 5 carbon atoms. For example, the alcohol may be at least one selected from the group consisting of methyl alcohol, ethyl alcohol, propyl alcohol, butyl alcohol, pentyl alcohol, and isomers thereof. Specifically, the alcohol may be methyl alcohol, ethyl alcohol, isopropyl alcohol, and n-propyl alcohol.

The amount of the alcohol may be 5 wt % to 20 wt % based on the total amount of the mixed solvent. When the amount of the alcohol is less than 5 wt % based on the total amount of the mixed solvent, a phenomenon in which the phase of the slurry is unstable and precipitates occurs, and thus, it is not preferable because during coating, the thickness is not only difficult to control, but also the adhesion force is significantly lowered. When the amount of the alcohol is more than 20 wt %, it is not preferable because the output and cycle characteristics of the secondary battery may be lowered, or the electrode adhesion force may also be lowered.

The binder is not particularly limited as long as it performs a function of stably fixing the inorganic material by connecting the inorganic material to the separator coating layer. For example, the binder may be one selected from the group consisting of polyvinylidene fluoride-co-trichloroethylene copolymer, polymethyl methacrylate, polybutyl acrylate, polyacrylonitrile, polyvinylpyrrolidone, polyvinyl acetate, polyethylene-co-vinyl acetate copolymer, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, and carboxylmethyl cellulose, or a mixture of two or more thereof.

A method of manufacturing a separator for a secondary battery according to the present invention may include the following steps (a) to (c), the following inorganic material may be a metal hydroxide, and the following dispersant may be a compound including 10 to 30 hydroxy groups in one molecule:

(a) preparing a primary slurry by adding and mixing an inorganic material and a dispersant in a mixed solvent including two or more solvents;

(b) preparing a secondary slurry by adding and mixing a binder to the primary slurry; and (c) coating and drying the secondary slurry on a porous separator substrate of a polyolefin-based material.

Specifically, the primary slurry for a coating layer is prepared by dissolving the metal hydroxide and the dispersant containing 10 to 30 hydroxy groups in one molecule in the mixed solvent containing alcohol and mixing for 30 minutes. The binder is added to the primary slurry and then mixed to prepare the secondary slurry. In the process of preparing the secondary slurry, a conventional ball mill or roll mill, a sand mill, a pigment disperser, an ultrasonic disperser, a homogenizer, and a planetary mixer may be used.

The secondary slurry may be coated on at least one surface of the porous separator substrate of a polyolefin-based material and then dried to form a coating layer. Specifically, since the mixed solvent includes a good solvent and a poor solvent of the binder, a porous coating layer may be formed by a phase separation effect through a vapor-induced phase separation process occurring in a drying process.

In general, an organic-inorganic porous coating layer obtained by this method has an advantage of excellent impregnation and low resistance during the operation of the battery, while the organic-inorganic porous coating layer has a disadvantage in that adhesion force is lowered due to swelling after injection during the manufacturing process of the battery. However, the present invention provides a separator having improved adhesion force between the separator and the electrode by using the metal hydroxide and the dispersant having a large number of hydroxy groups.

It is preferable that the vapor-induced phase separation process is performed in a predetermined range of humidity. After coating the slurry, a phase separation of the binder may occur due to a non-solvent water vapor on a surface of the separator during the humidification and drying process. The binder gelled by phase separation may exhibit a structure having pores and is dried in the structure having pores to form a porous coating layer. In addition, since humidification and drying occur from the surface of the separator, the binder may move to the surface of the separator to form a thick adhesive layer.

At this time, LIPS (Liquid-Induced Phase Separation) occurs simultaneously. LIPS appears in an environment in which a good solvent above a certain ratio that a polymer binder can be dissolved and a poor solvent below a certain ratio that a polymer binder can be dissolved are mixed. When the boiling point of the good solvent is lower than that of the poor solvent (for example, the boiling point of acetone, which is a good solvent, is 56° C., and the boiling point of isopropyl alcohol, which is a poor solvent, is 82° C.), the ratio of the good solvent in a mixed solvent is lowered, and the ratio of the poor solvent is relatively higher since the good solvent having a low boiling point evaporates at a faster rate than the poor solvent as the solvent of the coating layer is dried. Therefore, the phase separation occurs at a critical point where the binder does not dissolve. The phase-separated binder forms a porous structure and at the same time, the ratio of the good solvent from the surface of the separator decreases, so that the good solvent in the coating layer slurry may rapidly move to the surface of the separator like the binder.

Therefore, it may be easy to form an adhesive layer on the surface of the separator while the above process and the vapor-induced phase separation process occur simultaneously.

Figure 1:
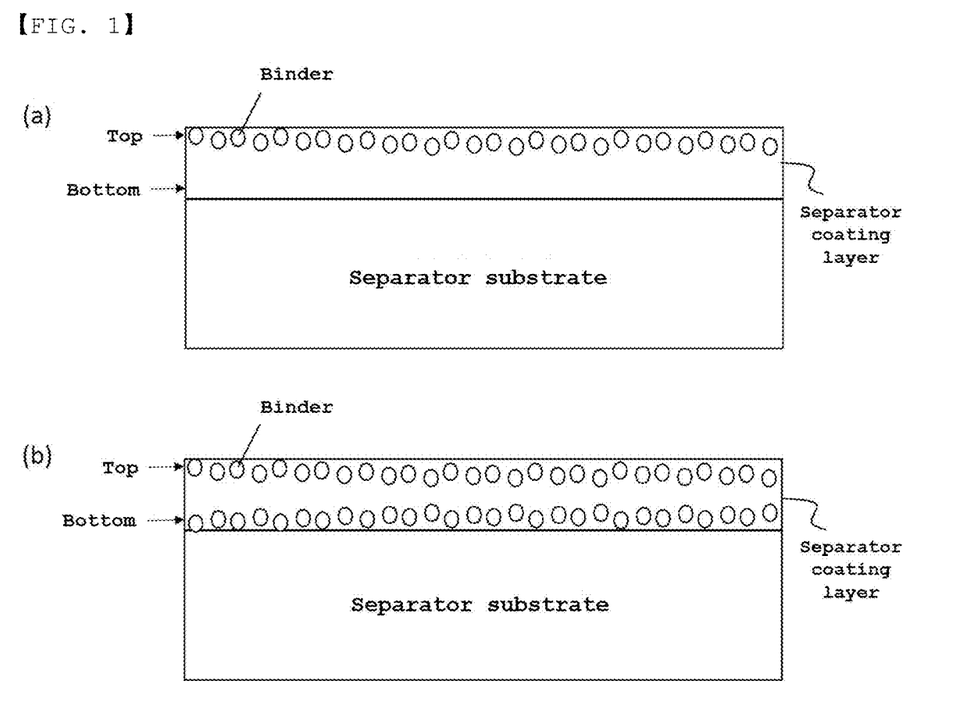
FIG. 1 is comparative schematic diagrams of a distribution of a binder depending on whether or not a vapor-induced phase separation is occurred.

When only a dispersant has been used to prepare a slurry for a coating layer in the art, a binder has been mainly distributed on a separator coating layer (FIG. 1(a)), and thus, there was a problem in that the binding strength between the coating layer and a separator substrate was weak. However, when using the mixed solvent containing alcohol and performing the vapor-induced phase separation as in the present invention, the binder is dispersed not only on an upper side of the coating layer but also on a lower side of the coating layer (FIG. 1(b)). Therefore, it is possible to secure the binding strength between the coating layer and the separator substrate and improve the adhesion force between the separator and the electrode.

The separator substrate is not limited as long as it is a planar porous polymer substrate commonly used in secondary batteries, such as a porous film formed of various polymers or a non-woven fabric. For example, the separator substrate may be a polyolefin-based porous film commonly used as a separator for a lithium secondary battery, or a non-woven fabric made of polyethylene terephthalate fiber, and its material or form may be variously selected depending on a desired purpose.

The polyolefin-based porous film may be obtained from a polyolefin-based polymer, for example, high-density polyethylene, linear low-density polyethylene, low-density polyethylene, ultra-high molecular weight polyethylene, polypropylene, polybutylene, polypentene or a mixture thereof. The non-woven fabric may also be obtained from a fiber made of such a polyolefin-based polymer or a polymer having higher heat-resistance than the polyolefin-based polymer.

The thickness of the porous polymer substrate is not particularly limited, but may be 1 μm to 100 μm, and particularly 5 μm to 50 μm.

Hereinafter, the present invention will be described with reference to the following examples. These examples are provided only for illustration of the present invention and should not be construed as limiting the scope of the present invention.

Comparative Example 1

16 wt % of aluminum hydroxide (Al(OH)$_3$) as an inorganic material and 0.2 wt % of tannic acid as a dispersant were introduced into 80 wt % of acetone as a solvent, followed by mixing for 30 minutes, to prepare a primary slurry.

3.8 wt % of polyvinylidene fluoride (PVDF) as a binder was added to the primary slurry, and then the inorganic material was pulverized and dispersed by using a ball-mill method for 1 hour, to prepare a secondary slurry.

The secondary slurry was coated to a thickness of 4 μm on both surfaces of a porous separator substrate of a polyolefin-based material having a thickness of 9 μm, and gas-state water vapor was introduced into a steambox and dried at 25° C. for 10 minutes to manufacture a separator.

Comparative Example 2

A separator was manufactured using the same method as in Comparative Example 1, except that a mixed solvent including 68 wt % of acetone and 12 wt % of isopropyl alcohol was used, instead of using the solvent of 80 wt % of acetone of Comparative Example 1; a primary slurry was prepared without adding tannic acid; and the amount of polyvinylidene fluoride was changed from 3.8 wt % to 4 wt %.

Comparative Example 3

A separator was manufactured using the same method as in Comparative Example 1, except a primary slurry was prepared without adding tannic acid and the amount of polyvinylidene fluoride was changed from 3.8 wt % to 4 wt %.

Example 1

A mixed solvent including 68 wt % of acetone and 12 wt % of isopropyl alcohol (IPA) was prepared. Then, 16 wt % of aluminum hydroxide (Al(OH)$_3$) as an inorganic material and 0.3 wt % of tannic acid as a dispersant were introduced into the mixed solvent, followed by mixing for 30 minutes, to prepare a primary slurry.

3.7 wt % of polyvinylidene fluoride (PVDF) as a binder was added to the primary slurry, and then the inorganic material was pulverized and dispersed by using a ball-mill method for 1 hour, to prepare a secondary slurry.

The secondary slurry was coated to a thickness of 4 μm on both surfaces of a porous separator substrate of a polyolefin-based material having a thickness of 9 μm, and gas-state water vapor was introduced into a steambox and dried at 25° C. for 10 minutes to manufacture a separator.

Example 2

A separator was manufactured using the same method as in Example 1, except that the amount of tannic acid was changed from 0.3 wt % to 0.1 wt % and the amount of polyvinylidene fluoride was changed from 3.7 wt % to 3.9 wt %.

Comparative Example 4

A separator was manufactured using the same method as in Example 1, except that the amount of tannic acid was changed from 0.3 wt % to 0.05 wt % and the amount of polyvinylidene fluoride was changed from 3.7 wt % to 3.95 wt %.

Comparative Example 5

A separator was manufactured using the same method as in Example 1, except that the amount of tannic acid was changed from 0.3 wt % to 0.5 wt % and the amount of polyvinylidene fluoride was changed from 3.7 wt % to 3.5 wt %.

Example 3

A separator was manufactured using the same method as in Example 1, except that the amount of tannic acid was changed from 0.3 wt % to 0.2 wt %; the amount of polyvinylidene fluoride was changed from 3.7 wt % to 3.8 wt %; the amount of acetone was changed from 68 wt % to 76 wt %; and the amount of isopropyl alcohol was changed from 12 wt % to 4 wt %.

Example 4

A separator was manufactured using the same method as in Example 1, except that the amount of tannic acid was changed from 0.3 wt % to 0.2 wt %; the amount of polyvinylidene fluoride was changed from 3.7 wt % to 3.8 wt %; the amount of acetone was changed from 68 wt % to 64 wt %; and the amount of isopropyl alcohol was changed from 12 wt % to 16 wt %.

Comparative Example 6

A separator was manufactured using the same method as in Example 3, except that the amount of acetone was changed from 76 wt % to 78 wt % and the amount of isopropyl alcohol was changed from 4 wt % to 2 wt %.

Comparative Example 7

A separator was manufactured using the same method as in Example 3, except that the amount of acetone was changed from 76 wt % to 60 wt % and the amount of isopropyl alcohol was changed from 4 wt % to 20 wt %.

Example 5

A separator was manufactured using the same method as in Example 1, except that the amount of tannic acid was changed from 0.3 wt % to 0.2 wt % and the amount of polyvinylidene fluoride (PVDF) was changed from 3.7 wt % to 3.8 wt %.

Example 6

A separator was manufactured using the same method as in Example 5, except that ethyl alcohol was used instead of isopropyl alcohol in Example 5.

Example 7

A separator was manufactured using the same method as in Example 5, except that methyl alcohol was used instead of isopropyl alcohol in Example 5.

Example 8

A separator was manufactured using the same method as in Example 5, except that n-propyl alcohol was used instead of isopropyl alcohol in Example 5.

In order to confirm the physical properties of the separators manufactured in Examples 1 to 8 and Comparative Examples 1 to 7, the coatability, loading amount, air permeability, and adhesion force were measured.

The measurement method of each property is as follows.

<Coatability>

Figure 2:
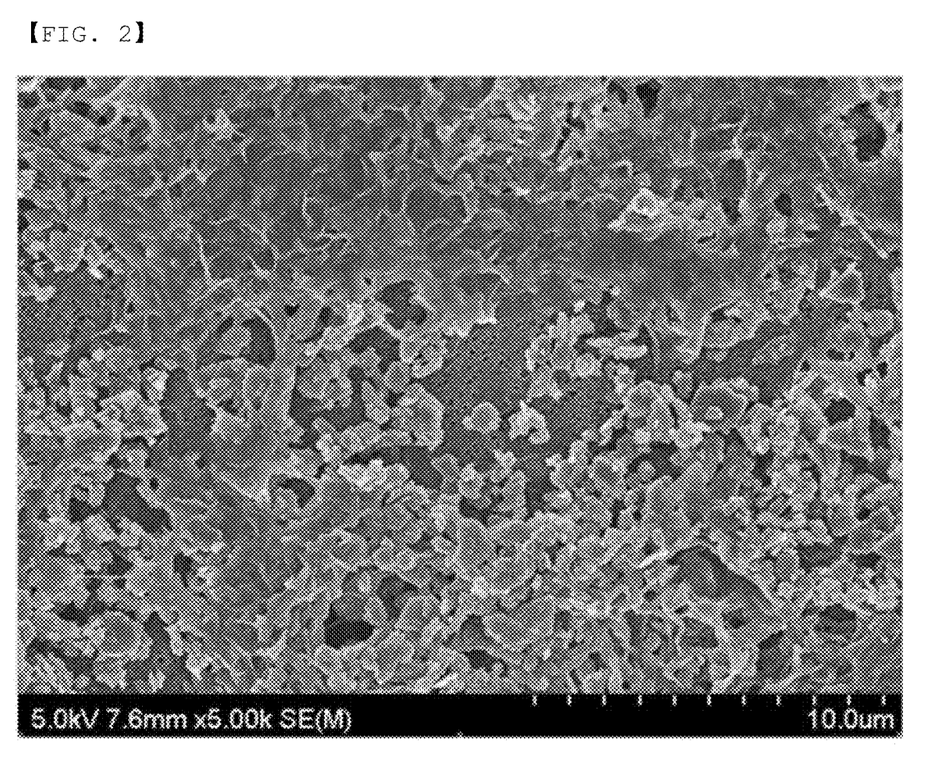
FIG. 2 shows a state in which an experimental result of measuring coatability is Δ.
Figure 3:
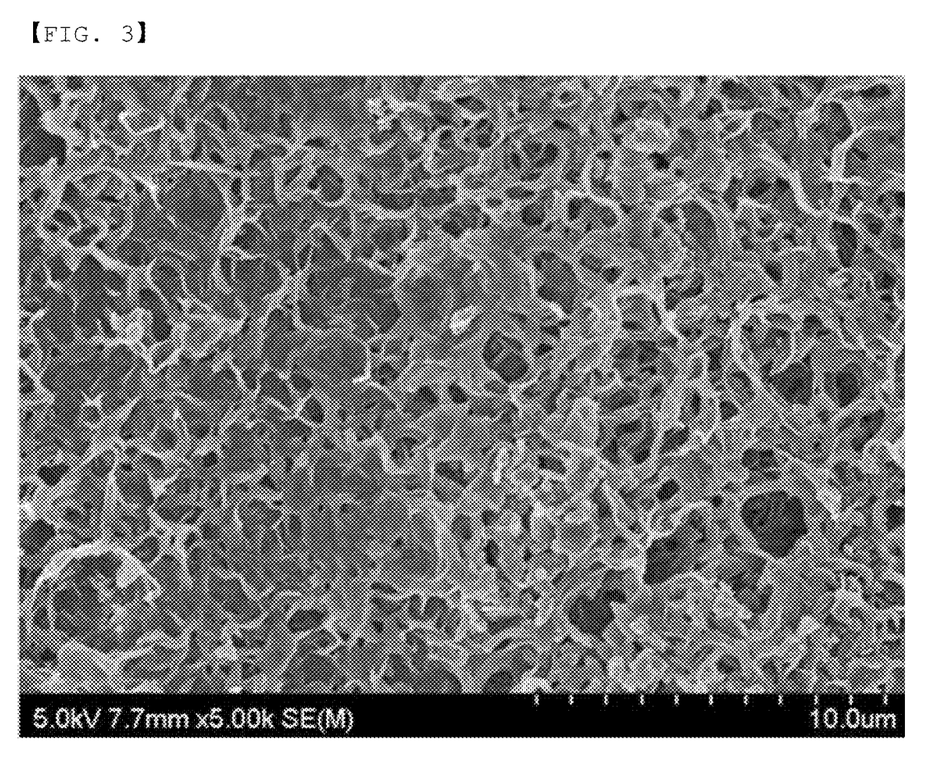
FIG. 3 shows a state in which an experimental result of measuring coatability is ○.

While coating the secondary slurry on the separator substrate, the state of being coated was observed, and the results of SEM of the secondary slurry were shown in FIGS. 2 and 3. FIG. 2 shows a state in which the coatability is Δ, and FIG. 3 shows a state in which the coatability is ○.

The indications of coatability result in Table 1 below shows the following state.

X: a state in which coating is impossible due to the slurry agglomerated like foam Δ: a state in which it is impossible to control the thickness of the coating layer and the surface of the separator is exposed as the phase of the slurry is unstable and precipitated ○: a state in which the separator substrate is not exposed as the coating layer is very uniformly coated on the separator substrate <Air Permeability>

The time (sec) required for air of 100 ml to pass through the separator was measured under the predetermined pressure (0.05 MPa) using an air permeation measuring machine (Maker: Asahi Seiko, Model: EG01-55-1MR). A total of three points, each one point in the left/middle/right of the sample, was measured and an average was recorded.

<Adhesion Force>

A negative electrode slurry was obtained by introducing natural graphite, styrene-butadiene rubber (SBR), carboxymethylcellulose (CMC) and a conductive agent (90:2.5:2.5:5 by weight) into water. The negative electrode slurry was coated on a copper thin film (thickness of 20 μm) with a loading amount of 5 mg/cm$^2$ and then dried. It was rolled under the conditions of 90° C. and 8.5 MPa and cut into 60 mm (length)×25 mm (width) to obtain a negative electrode. The separator obtained through each of Examples and Comparative Examples was cut into 70 mm (length)×25 mm (width), and the prepared negative electrode and separator were laminated under the conditions of 70° C. and 4 MPa using a press to prepare a specimen.

The prepared specimen was fixed to a glass plate using a double-sided tape, and the negative electrode was placed so as to face the glass plate.

Using a UTM equipment (Maker: Instron, Model: 3345), the separator portion of the specimen was pulled at a peeling rate of 300 mm/min and a peeling angle of 180°, and the force required to completely separate the separator was measured.

The experimental conditions and measurement results of the properties for the separators manufactured in Examples and Comparative Examples are shown in Table 1 below.

TABLE 1

| | Composition | | | | | | | Air | |
| --- | --- | --- | --- | --- | --- | --- | --- | --- | --- |
| | Al(OH)$_3$ (wt %) | PVDF (wt %) | TA (wt %) | Acetone (wt %) | Alcohol (wt %) | Types of alcohol | Coatability | permeability | Adhesion force |
| Comparative Example 1 | 16 | 3.8 | 0.2 | 80 | 0 | IPA | ○ | 383 | 30 |
| Comparative Example 2 | 16 | 4 | 0 | 68 | 12 | IPA | ○ | 240 | 35 |
| Comparative Example 3 | 16 | 4 | 0 | 80 | 0 | IPA | X | Impossible to measure | |
| Example 1 | 16 | 3.7 | 0.3 | 68 | 12 | IPA | ○ | 262 | 89 |
| Example 2 | 16 | 3.9 | 0.1 | 68 | 12 | IPA | ○ | 326 | 76 |
| Comparative Example 4 | 16 | 3.95 | 0.05 | 68 | 12 | IPA | Δ | 253 | 40 |
| Comparative Example 5 | 16 | 3.5 | 0.5 | 68 | 12 | IPA | ○ | 196 | 23 |
| Example 3 | 16 | 3.8 | 0.2 | 76 | 4 | IPA | ○ | 348 | 65 |
| Example 4 | 16 | 3.8 | 0.2 | 64 | 16 | IPA | ○ | 267 | 90 |
| Comparative Example 6 | 16 | 3.8 | 0.2 | 78 | 2 | IPA | Δ | 355 | 37 |
| Comparative Example 7 | 16 | 3.8 | 0.2 | 60 | 20 | IPA | ○ | 5,946 | 33 |
| Example 5 | 16 | 3.8 | 0.2 | 68 | 12 | IPA | ○ | 232 | 79 |
| Example 6 | 16 | 3.8 | 0.2 | 68 | 12 | Ethyl alcohol | ○ | 228 | 73 |
| Example 7 | 16 | 3.8 | 0.2 | 68 | 12 | Methyl alcohol | ○ | 190 | 69 |
| Example 8 | 16 | 3.8 | 0.2 | 68 | 12 | n-propyl alcohol | ○ | 244 | 80 |

Referring to Table 1, Comparative Examples 1 to 3 are for examining the effect when at least one of the dispersant and the alcohol is omitted.

In Comparative Example 1 in which the alcohol was omitted, the air permeability was poorly measured. Comparative Example 2, in which the dispersant was omitted, shows a remarkably low adhesion force.

In addition, in Comparative Example 3 in which both the alcohol and the dispersant were omitted, the slurry was agglomerated so that coating was not possible, and thus the loading amount, air permeability, and adhesion force could not be measured.

When comparing the results of Example 1, Example 2, Comparative Example 4 and Comparative Example 5 to analyze a preferred amount of the dispersant, it can be seen that the preferred amount of the dispersant is 0.1 wt % to 0.3 wt %. When the amount of the dispersant was too small, the coatability was poor and the adhesion force was low. When the amount of the dispersant was too large, the coatability was excellent but the adhesion force was measured low.

When comparing the results of Example 3, Example 4, Comparative Example 6 and Comparative Example 7 to analyze a preferred amount of the alcohol, it can be seen that the preferred amount of the alcohol is 5 wt % (4 wt %/80 wt %) to 20 wt % (16 wt %/80 wt %) based on the total amount of the mixed solvent. When the amount of the alcohol was too low, the coatability was poor and the adhesion force was low. When the amount of the alcohol was too large, the air permeability and adhesion force were significantly reduced. In particular, the air permeability of the separator of Comparative Example 7 was 5,946 s/100 ml. Considering that in general, the output of the battery is lowered and the cycle characteristics of the battery are decreased normally when the air permeability is 1,000 s/100 ml or more, it can be seen that the separator of Comparative Example 7 has very poor properties.

When comparing the results of Examples 5 to 8 to compare the properties of the separators according to the types of alcohol used in the present invention, it can be seen that a very uniform coating layer was formed, the air permeability showed good values, and the adhesion force was improved.

As described above, when using the separator for a secondary battery according to the present invention and a method of manufacturing the same, it is possible to manufacture a separator with improved adhesion force in addition to forming the uniform coating layer.

Although described above with reference to examples of the present invention, those skilled in the art to which the present invention pertains will appreciate that various applications and modifications are possible based on the above description, without departing from the scope of the present invention.

INDUSTRIAL APPLICABILITY

As is apparent from the above description, a separator for a secondary battery according to the present invention improves dispersion force of a metal hydroxide inorganic material when preparing a slurry for forming a coating layer, and thus, a uniform coating layer may be formed by preventing the slurry from agglomerating.

In addition, a binder of the coating layer is distributed more toward on an outermost surface of the separator, thereby improving the adhesion force to the electrode. Therefore, it is possible to solve the problem such that the adhesion force to the electrode was lowered even though the dispersion force was improved in the conventional coating layer.

Therefore, it is possible to prevent the electrode and the separator from being disintercalated after an electrolyte solution is injected. As short-circuiting or reducing lifespan of a secondary battery due to disintercalation of the separator from an electrode assembly may be prevented, it is possible to provide a separator for a secondary battery with improved safety.

The invention claimed is:

1. A separator for a secondary battery, comprising:
   a porous separator substrate comprising a polyolefin-based material; and
   a coating layer on at least one surface of the porous separator substrate,
   wherein the coating layer is a dry form of a slurry comprising a binder, an inorganic material, a mixed solvent comprising at least two solvents, and a dispersant, wherein
   the inorganic material is a metal hydroxide, and
   the dispersant is tannic acid, and a total amount of the dispersant present in the coating layer is 0.1 wt % to 0.3 wt %.

2. The separator for a secondary battery according to claim 1, wherein the metal hydroxide is represented by the following formula (1), $$M(OH)_x \quad (1)$$

wherein, in formula (1), M is B, Al, Mg, Co, Cu, Fe, Ni, Ti, Au, Hg, Zn, Sn or Zr, and x is an integer of 1 to 4.

3. The separator for a secondary battery according to claim 1, wherein the total amount of the dispersant present in the coating layer is 0.2 wt % to 0.3 wt %.

4. The separator for a secondary battery according to claim 1, wherein the mixed solvent comprises an alcohol.

5. The separator for a secondary battery according to claim 4, wherein the alcohol is an alcohol having 1 to 5 carbon atoms.

6. The separator for a secondary battery according to claim 4, wherein a total amount of the alcohol present is 5 wt % to 20 wt % based on a total amount of the mixed solvent.

7. The separator for a secondary battery according to claim 1, wherein the coating layer has a higher concentration of the binder, relative to a center of the separator, on a surface facing the substrate and on a surface facing the active material.

8. A method of manufacturing the separator for a secondary battery according to claim 1, the method comprising:
   (a) preparing a primary slurry by adding and mixing the inorganic material and the dispersant in the mixed solvent comprising at least two solvents;
   (b) preparing a secondary slurry by adding and mixing the binder to the primary slurry; and
   (c) coating and drying the secondary slurry on the at least one surface of the porous separator substrate comprising the polyolefin-based material.

9. The method according to claim 8, wherein the mixed solvent comprises an alcohol.

10. The method according to claim 8, wherein step (c) comprises a vapor-induced phase separation (VIPS) process.

11. The method according to claim 10, during the vapor-induced phase separation process, liquid-induced phase separation (LIPS) occurs simultaneously.

12. An electrochemical device comprising the separator for a secondary battery according to claim 1.

* * * * *